April 9, 1929.  G. W. COLE  1,708,923
SHOCK ABSORBING COUPLING FOR SHAFTS
Filed Aug. 5, 1926  2 Sheets-Sheet 1
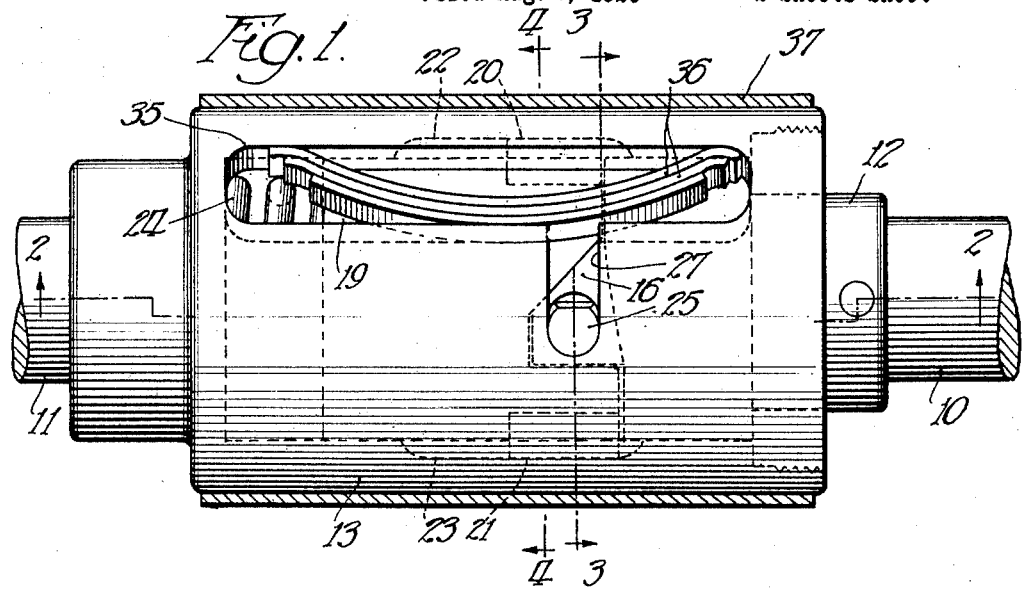
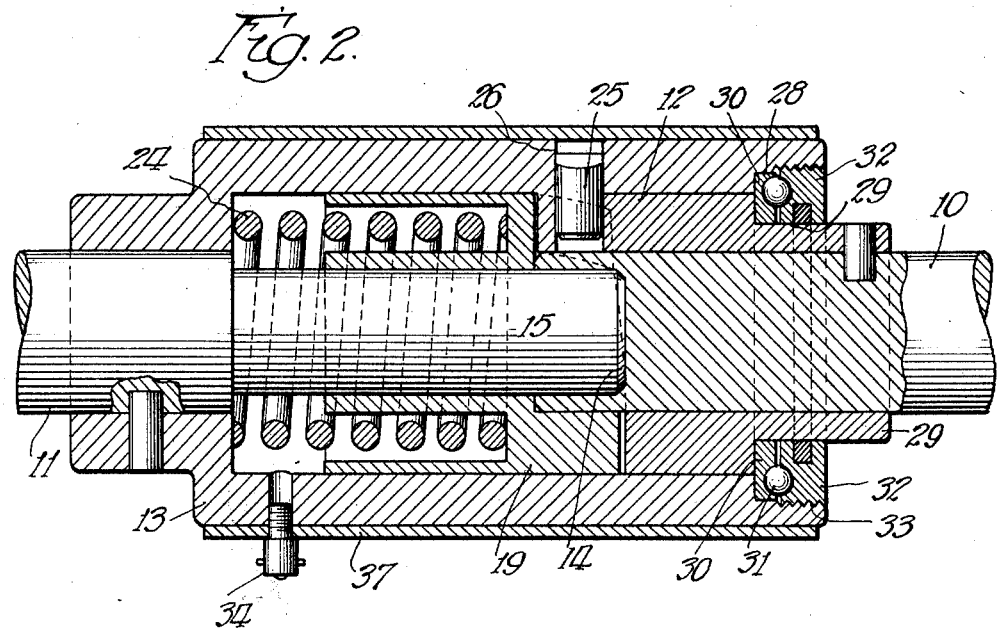
Inventor
George W. Cole.

April 9, 1929.  G. W. COLE  1,708,923
SHOCK ABSORBING COUPLING FOR SHAFTS
Filed Aug. 5, 1926  2 Sheets-Sheet 2
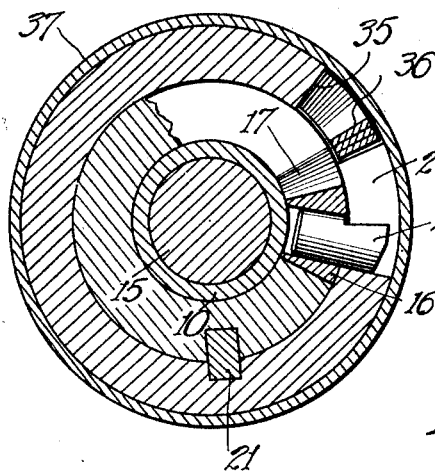
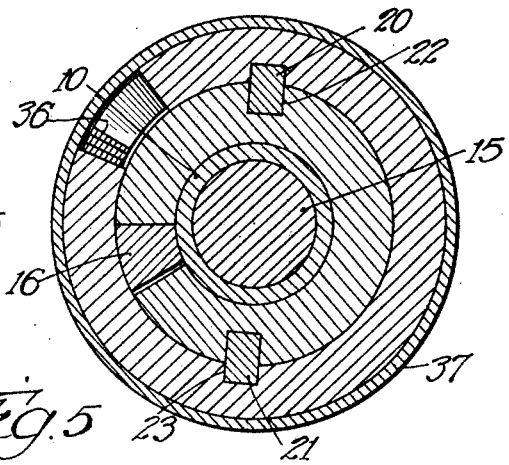
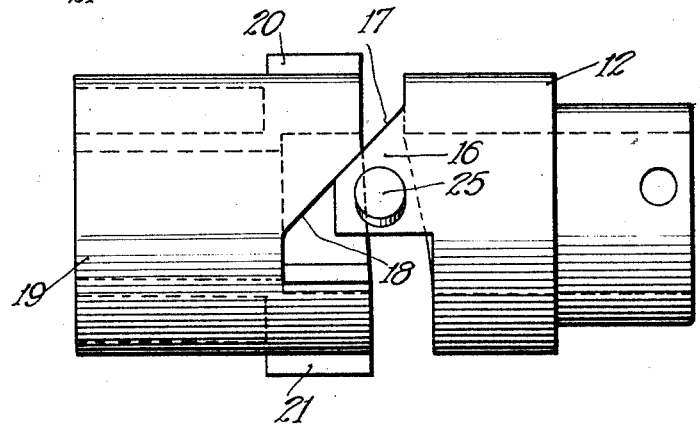
Inventor
George W. Cole Patented Apr. 9, 1929.

1,708,923

UNITED STATES PATENT OFFICE.

GEORGE W. COLE, OF MISHAWAKA, INDIANA, ASSIGNOR TO GEORGE W. COLE, VITUS G. JONES, AND WALTER A. SWEENEY, TRUSTEES, ALL OF SOUTH BEND, INDIANA.

SHOCK-ABSORBING COUPLING FOR SHAFTS.

Application filed August 5, 1926. Serial No. 127,245.

This invention relates to shock absorbers for power transmitting shafts, and broadly speaking, aims to provide a device which will cushion the shocks incident to the sudden starting or stopping of a shaft.

The invention may be understood by reference to one illustrative embodiment shown in the accompanying drawings, in which:

Fig. 1 is an elevation of the device shown as at rest, the cover being in longitudinal section;

Fig. 2 is a longitudinal cross section substantially on line 2—2 of Fig. 1;

Figs. 3 and 4 are transverse sections respectively on lines 3—3 and 4—4 of Fig. 1; and Fig. 5 is an elevation of the two cam members apart from the remainder of the mechanism, shown in a different relative position from that of Fig. 2.

Whenever a load-carrying shaft is suddenly connected, as by a clutch, to a source of power, a strain is put on the shaft and its connected parts, the severity of which depends upon the load, the speed normally imparted from the source of power, the time interval during which the power connection is made, and various other factors. A typical instance is the automobile, whose shaft, universal joint, differential and wheels are suddenly connected with a rapidly driven engine by means of a powerful clutch. Usually, the parts driving the wheels are so strong that, before the car starts, the wheels slip, even over a dry surface affording excellent traction. Such slipping wears out the tires rapidly and is significant of the severe strain to which many parts of the car are put, when quickly started. The invention particularly aims to reduce the strain on the parts of an automobile or other mechanism, by providing a device of simple but rugged construction to absorb instantaneously much if not all of the shock arising from the connection of a shaft with a source of power, thereby contributing to the long life and enhanching the service obtainable from the mechanism.

Referring specifically to the drawings, there is shown a drive shaft 10 and a driven shaft 11, between which is interposed a device embodying the invention. In the present instance, the drive shaft is presumed to turn clockwise (when viewed from the right end of Fig. 1), and the shock absorbing device is shown made so as to cooperate with a shaft so driven; but, as will be obvious after the preferred construction has been described, it is within the scope of the invention to provide for taking up the shocks imparted to a shaft rotating at different times in opposite directions.

Secured to the end of drive shaft 10 is a sleeve 12, which is nearly enclosed by a housing 13 secured to the driven shaft 11, and has a sliding fit within housing 13, so that it may turn on its axis, without wabbling. The shaft 10 extends through sleeve 12, as shown in Fig. 2, and its end is counterbored as at 14 to receive the reduced extension 15 of the driven shaft 11. Thus the alinement of the two shafts is maintained, while relative rotation is permitted. The shock-cushioning action is to take place during movement of the sleeve relative to the driven shaft, and therefore means are provided to act quickly and powerfully each time the sleeve turns within the housing.

To translate the relative rotary movement of the sleeve 12 into a sliding movement which may be easily cushioned, sleeve 12 has an arcuate cam projection 16 at its inner end of a radius equal to that of the sleeve and having a cam surface 17. The cam surface 17 is normally in contact with a complementary cam surface 18 provided on a reciprocable cushioned member 19, which may take various forms but is herein shown as a spring-pressed follower slidable within the housing over the shaft extension 15, and having keys 20, 21 (Figs. 1 and 4) movable within keyways 22, 23 respectively, in the housing. Thus follower 19 has only sliding motion relative to its housing and rotates therewith. A heavy spring 24 is interposed between one end of the housing and the follower 19 and maintains the sleeve 12 and follower at all times in contact.

From the foregoing, it will be clear that when shaft 10 is connected more or less suddenly with a source of power, the sleeve 12 which is secured thereto is turned on its axis within the housing 13, and by means of the cam 17, causes the slidable follower 19 to move against the spring 24 to compress it, the extent of such compression depending on the strength of the spring and the starting resistance of the load-carrying shaft 11. As soon as shaft 11 has the speed of shaft 10, the spring will cause the follower to move responsive to its expansion; and due to the sliding of cam 18 over cam 17, the sleeve will be turned back to its initial position, wherein the two cams are in contact throughout their entire length, as shown in Fig. 1.

To cause rapid cushioning of the shock imparted to the driven shaft, the two cam surfaces may be short segments of helices whose axes coincide with the common axis of the shafts. In one commercial form, the two cams are about 1¼" long and have a pitch such that a compression of the spring of from ¾" to ⅞" is effected during the sliding of the cams over each other. The cam surfaces may also be plane longitudinally or be otherwise formed. Whatever their form, they must cooperate with the spring or other cushioning means to effect a material shock-absorption upon starting the shaft 10.

It is highly desirable, for obvious reasons, to limit the extent of movement of the sleeve 12 within the housing, and to this end, a pin 25 is driven into a hole 26 (Fig. 2) in the sleeve, said pin projecting radially from the sleeve into a slot 27 extending circumferentially of the housing and subtending an arc of moderate size, as shown. The length of slot 27 limits the rotation of the sleeve relative to the housing, because when the pin 25 reaches the end of its travel, the shaft 10 is then directly connected with the housing, and hence with shaft 11.

To facilitate assembly, and to hold the parts in operative position, one end of the housing is open and counterbored as at 28, while the sleeve is reduced in diameter as shown at 29, to provide for a thrust bearing which will carry the thrust of spring 24 on the sleeve. The bearing may be a ball bearing, comprising a race 30, balls 31, and an adjustable collar 32, screw-threaded as at 33 within the end of the housing, and removable by a spanner wrench or the like. Such a bearing is most easily lubricated by filling the chamber provided by a housing with oil or grease, which will work its way out to the bearing. As illustrative of various lubricating systems, a force feed fitting 34 is shown in Fig. 2 connected by a bore in the housing. An ample supply of lubricant will materially reduce the friction losses due to the sliding of the follower 19 and of pin 25, and the turning of sleeve 12.

The described construction is very simple, and is easily manufactured. For some purposes it may be desirable to employ an auxiliary spring or springs which will aid in absorbing the shock of a sudden start. In the illustrative construction, the pin 25 is not stopped by the end of slot 27, but travels beyond the slot, entering a longitudinally extending recess 35 in the housing (Fig. 1), within which a leaf spring 36 is placed, so as to resist resiliently movement of the pin across the recess. The illustrative construction is such that the cams separate about the time the pin 25 engages the auxiliary spring, which kicks back the pin and the sleeve 12 after shaft 11 has started.

If the pin 25 is carried by the cam extension 16, as shown, it will be near the medial plane of the housing and hence will encounter the leaf spring 36 near its middle, which is desirable because the spring is there strongest. The spring 36 is shorter than the recess so that when depressed its consequent lengthening will be accommodated. To close the recess and the slot 27, a cover 37 completely encloses the cylindrical wall of the housing and is secured by screws or the like (not shown). If desired, such a cover may be used in connection with ordinary felt packing (not shown) to prevent undue loss of lubricant.

It will be observed that the auxiliary spring is not active until the primary shock-absorbing spring 24 has been compressed to the maximum extent, and hence that when the starting torque is not excessive, the spring 24 may entirely cushion the shock. When the primary shock is very severe, both springs will be brought into action, and the pin 25 may even momentarily flatten the leaf spring before the housing and hence the driven shaft 11 assume the angular velocity of the driving shaft. As the angular velocities approach each other, the pin 25 is kicked back, whereupon the cams 17 and 18 again engage, and the follower 19 moves toward the sleeve until finally the parts are in the position of equilibrium shown in Fig. 1.

While a coil spring 24 has been shown interposed between the follower 19 and the housing, as the type of shock absorbing means to be preferred because of its inexpensiveness, dependability, ease of installation, etc., nevertheless I may desire for certain conditions to employ a liquid check or a combined liquid and spring check of the types well known in the art of door checks and closers, for example. Hence in the claims, the term "shock absorbing means" or its equivalent "shock cushioning means" is not to be construed as limited to a spring.

As stated above, it is within the scope of the invention to cushion shocks delivered to a shaft rotating in either of two directions. By merely providing two sets of sliding cam faces inclined in opposite directions, the described construction will cushion the shock of starting of such a shaft, or the strain of sudden starting and stopping of a shaft usually turning in only one direction.

Obviously, the invention is not restricted to the particular embodiment thereof herein shown and described. Moreover, it is not indispensable that all the features of the invention be used conjointly since they may be employed advantageously in various combinations and sub-combinations as defined in the claims.

What I claim is:

1. A device of the class described comprising, in combination, a drive shaft and a driven shaft; a hollow member secured to one of the shafts and receiving the end of the other shaft; the wall of said member provided with an arcuate slot which extends in a plane at right angles to the longitudinal axis of the shafts; a pin secured to said other shaft and extending into the slot so that relative rotation of the two shafts is definitely limited; and shock absorbing means interposed between the two shafts to cushion the strains set up by a sudden change in velocity of one or the other of the shafts.

2. A device of the class described comprising, in combination, a drive shaft and a driven shaft; a cam member secured to the drive shaft; means compressed by the cam member upon starting of the drive shaft to absorb some of the shock of starting; a projection carried by said cam member; and a spring arranged in the path of the projection and so constructed as to resist pressure from the shaft transmitted through the cam member and projection and ultimately entirely to stop movement of the cam member relative to the driven shaft, so that the two shafts are first yieldably connected and finally are directly connected.

3. A device of the class described comprising, in combination, a drive shaft and a driven shaft; service shock cushioning means tending to resist relative rotation of said shafts and acting at a relatively small radial distance; emergency shock cushioning means rendered operative only after actuation of said service means and acting at the maximum radial distance permitted by the dimensions of the device; and positive drive means at maximum radial distance and engaged at the end of the action of said emergency means, to limit positively the maximum relative displacement of said shafts.

4. A device of the class described comprising, in combination, a drive shaft and a driven shaft; service shock cushioning means tending to resist relative rotation of said shafts and acting at a relatively small radial distance; emergency shock cushioning means rendered operative only after actuation of said service means; and positive drive means acting at greater radial distance than said service shock cushioning means and engaged at the end of the action of said emergency means, to limit positively the maximum relative displacement of said shafts.

5. A device of the class described comprising, in combination, a drive shaft and a driven shaft; service shock cushioning means tending to resist relative rotation of said shafts; emergency shock cushioning means rendered operative only after actuation of said service means; and positive drive means limiting the yielding of said emergency cushioning means.

In testimony whereof, I have signed my name to this specification.

GEORGE W. COLE.